(12) United States Patent
Balakrishnan et al.

(10) Patent No.: US 11,711,829 B2
(45) Date of Patent: Jul. 25, 2023

(54) CONTEXT AWARE MODE SWITCHING OF WIRELESS DEVICE

(71) Applicant: Meta Platforms Technologies, LLC, Menlo Park, CA (US)

(72) Inventors: Swaminathan Balakrishnan, Los Gatos, CA (US); Achaleshwar Sahai, San Jose, CA (US); Ping Wang, Redmond, WA (US); Qi Qu, Redmond, WA (US); Yee Sin Chan, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/356,623

(22) Filed: Jun. 24, 2021

(65) Prior Publication Data

US 2022/0417922 A1    Dec. 29, 2022

(51) Int. Cl.
*H04W 72/51* (2023.01)
*H04W 28/08* (2023.01)
*H04W 72/543* (2023.01)
*H04L 1/1812* (2023.01)
*H04W 52/02* (2009.01)

(52) U.S. Cl.
CPC ........... *H04W 72/51* (2023.01); *H04L 1/1812* (2013.01); *H04W 28/0967* (2020.05); *H04W 72/543* (2023.01); *H04W 52/0254* (2013.01)

(58) Field of Classification Search
CPC ......... H04W 72/04–0493; H04W 28/09–0992; H04W 52/0251–0258; H04L 1/18–1896
See application file for complete search history.

(56) References Cited

U.S. PATENT DOCUMENTS

| | | | |
|---|---|---|---|
| 2013/0229906 A1* | 9/2013 | Akkarakaran | H04W 28/04 370/216 |
| 2017/0276797 A1* | 9/2017 | Hsieh | G01C 21/14 |
| 2017/0331670 A1* | 11/2017 | Parkvall | H04J 11/0056 |
| 2018/0115970 A1* | 4/2018 | Chae | H04W 4/026 |
| 2018/0139028 A1* | 5/2018 | Lim | H04L 5/0055 |
| 2018/0175977 A1* | 6/2018 | Song | H04J 11/003 |
| 2018/0206246 A1* | 7/2018 | Zhang | H04L 1/1896 |
| 2019/0053211 A1* | 2/2019 | Ying | H04W 72/044 |
| 2019/0098579 A1* | 3/2019 | Cha | H04W 4/20 |
| 2020/0145924 A1* | 5/2020 | Tang | H04L 5/0053 |

(Continued)

FOREIGN PATENT DOCUMENTS

| | | | | |
|---|---|---|---|---|
| WO | WO-2018204491 A1 * | 11/2018 | | H04L 1/16 |
| WO | WO-2020085854 A1 * | 4/2020 | | H04L 1/1812 |

*Primary Examiner* — Chi H Pham
*Assistant Examiner* — Vladislav Y Agureyev
(74) *Attorney, Agent, or Firm* — Foley & Lardner LLP (57) ABSTRACT

Described embodiments provide systems and methods for adjusting an operating mode for a wireless device's communications with a network. The wireless device may determine a communication profile of an application of the wireless device with the network. The wireless device may determine a type of motion of the wireless device. The wireless device may determine an operating mode for the wireless device's communications with the network, according to the communication profile and the type of motion. The wireless device may transmit a message to the network to cause the operating mode to be configured for the wireless device's communications with the network.

20 Claims, 4 Drawing Sheets

(56) References Cited

U.S. PATENT DOCUMENTS

| | | |
|---|---|---|
| 2021/0014026 A1* | 1/2021 | Papasakellariou .... H04L 1/1861 |
| 2021/0014791 A1* | 1/2021 | Freda .................... H04L 5/0053 |
| 2021/0144750 A1* | 5/2021 | Cao ................... H04W 72/0453 |
| 2021/0410132 A1* | 12/2021 | Xu ....................... H04B 7/0695 |
| 2022/0029753 A1* | 1/2022 | Papasakellariou .... H04L 1/1861 |
| 2022/0060853 A1* | 2/2022 | Gummadi ............. H04W 4/025 |
| 2022/0224445 A1* | 7/2022 | Xu ......................... H04B 7/155 |
| 2022/0346103 A1* | 10/2022 | Dutta ................... H04W 72/20 |

\* cited by examiner

CONTEXT AWARE MODE SWITCHING OF WIRELESS DEVICE

FIELD OF THE DISCLOSURE

The present application generally relates to systems and methods of adjusting an operating mode, including but not limited to systems and methods for adjusting an operating mode for a wireless device's communications with a network according to at least a communication profile.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by an artificial reality computing device communicatively coupled to the HWD. In one example, the HWD includes various sensors that detect a location and/or orientation of the HWD, and transmits the detected location and/or orientation of the HWD to the computing device. The computing device can determine a user's view of the space of the artificial reality according to the detected location and/or orientation of the HWD, and generate image data indicating an image of the space of the artificial reality corresponding to the user's view. The computing device can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., 11 ms or 16 ms). A latency between a movement of the user wearing the HWD and an image displayed corresponding to the user movement can cause judder, which may result in motion sickness and can degrade the user experience.

SUMMARY

Various embodiments disclosed herein are related to systems and methods of adjusting, modifying, switching, or changing an operating mode (e.g., transmission (Tx) mode and/or reception (Rx) mode) for a wireless device's communications with a network according to (or based on) a communication profile (e.g., an application profile) and/or a type of motion of the wireless device (e.g., a computing device, a wearable device, and/or user equipment (UE)). For instance, the wireless device may dynamically switch a Tx/Rx mode of the wireless device (e.g., from Category 4 (or Category 1) to coverage enhancement (CE) mode) according to context information (e.g., type of motion and/or other information) of the wireless device, thereby increasing the coverage (e.g., wireless coverage) of the wireless device without consuming/using excessive power and/or network resources. In certain embodiments, the wireless device can request to be configured to disable/exit (or enable/enter) an operating mode (e.g., CE mode or other modes/categories) via a message, according to a type of traffic (e.g., a wireless traffic between the wireless device and the network). In one example, if the communication profile of the wireless device suggests/indicates that the traffic is low, the wireless device may request to be configured to disable/exit a CE mode (or other modes), for instance (e.g., to optimize for power efficiency). Furthermore, if the communication profile indicates a required/desired latency for the traffic (e.g., the latency is critical), the wireless device can request to be configured to disable/exit the CE mode. In one example, the wireless device may request to be configured to enter or operate in the CE mode and/or other modes (or the wireless device may enable CE mode and/or other modes) if a certain level of reliability is required/desired for the traffic (e.g., where reliability is a critical component/aspect of the application's wireless traffic).

In one aspect, the present disclosure is directed to a method for changing and/or switching an operating mode of a wireless device according to a type of motion of the wireless device and/or a communication profile of an application (e.g., an application's wireless traffic, a require latency, a desired reliability, and/or other aspects). The method can include determining, by the wireless device (e.g., a wearable device and/or UE), a communication profile of an application of the wireless device with a network (e.g., an application profile). The wireless device may determine a type of motion of the wireless device (e.g., a pedestrian motion, a biking motion, a vehicular motion, and/or a lack of motion). The wireless device may determine an operating mode (e.g., a coverage enhancement (CE) mode and/or other modes) for the wireless device's communications with the network (e.g., uplink (UL) communications and/or downlink (DL) communications), according to the communication profile and the type of motion. The wireless device may transmit a message (e.g., a measurement report, a message with a medium access control (MAC) header, and/or radio resource control (RRC) layer signaling) to the network to cause the operating mode to be configured for the wireless device's communications with the network.

In some embodiments, the communication profile may be indicative of at least one of: a type or characteristic of the application's wireless traffic between the wireless device and the network, a required or desired latency for the wireless traffic, or a required or desired reliability for the wireless traffic. In certain embodiments, the wireless device may determine the type of motion using at least one of: a motion sensor, or a positioning mechanism, or a Doppler measurement. The wireless device may determine the operating mode for the wireless device's communications with the network, by selecting the operating mode from a plurality of predefined operating modes. The operating mode can include an indication of at least one of: a number of repetition for data transmission, a number of hybrid automatic request (HARD) processes, and/or a scaling of the transport block size.

In some embodiments, the wireless device may determine the operating mode for the wireless device's communications with the network, further according to whether the application is operating in foreground or background. In certain embodiments, the message may comprise a report of at least one measurement metric, a message with a predefined value in a medium access control (MAC) header, or a message in a radio resource control (RRC) layer. In some embodiments, determining the type of motion of the wireless device may comprise determining that the wireless device is: stationary, moving along a trajectory, moving at a speed within a range, above a threshold, or below the threshold, or moving according to a speed or spatial pattern. In some embodiments, responsive to the message, the wireless device may receive an indication from the network to configure the wireless device to at least one of: enter the operating mode, exit a prior operating mode, or switch from the prior operating mode to the operating mode.

Various embodiments disclosed herein are related to a wireless device for adjusting an operating mode for a wireless device's communications with a network. In some embodiments, the wireless device may comprise at least one processor. The at least one processor may be configured to determine a communication profile of an application of the wireless device with a network. The at least one processor may be configured to determine a type of motion of the wireless device. The at least one processor may be configured to determine an operating mode for the wireless device's communications with the network, according to the communication profile and the type of motion. The at least one processor may be configured to transmit a message to the network to cause the operating mode to be configured for the wireless device's communications with the network.

In some embodiments, the communication profile may be indicative of at least one of: a type or characteristic of the application's wireless traffic between the wireless device and the network, a required or desired latency for the wireless traffic, or a required or desired reliability for the wireless traffic. In some embodiments, the at least one processor may be configured to determine the type of motion using at least one of: a motion sensor, or a positioning mechanism, or a Doppler measurement. The at least one processor may be configured to determine the operating mode for the wireless device's communications with the network, by selecting the operating mode from a plurality of predefined operating modes. The operating mode may include an indication of at least one of: a number of repetition for data transmission, a number of hybrid automatic request (HARD) processes, and/or a scaling of the transport block size.

In some embodiments, the at least one processor may be configured to determine the operating mode for the wireless device's communications with the network, further according to whether the application is operating in foreground or background. In certain embodiments, the message may comprise a report of at least one measurement metric, a message with a predefined value in a medium access control (MAC) header, or a message in a radio resource control (RRC) layer. In some embodiments, the at least one processor may be configured to determine the type of motion of the wireless device. Determining the type of motion of the wireless device may comprise determining that the wireless device is: stationary, moving along a trajectory, moving at a speed within a range, above a threshold, or below the threshold, or moving according to a speed or spatial pattern. Responsive to the message, the at least one processor may be configured to receive an indication from the network to configure the wireless device to at least one of: enter the operating mode, exit a prior operating mode, or switch from the prior operating mode to the operating mode.

Various embodiments disclosed herein are related to a non-transitory computer readable medium storing program instructions for adjusting an operating mode for a wireless device's communications with a network. The program instructions stored in a non-transitory computer readable medium may cause at least one processor to determine a communication profile of an application of the wireless device with a network. The at least one processor may reside in a device, such as a wireless device. The program instructions can cause the at least one processor to determine a type of motion of the wireless device. The program instructions may cause the at least one processor to determine an operating mode for the wireless device's communications with the network, according to the communication profile and the type of motion. The program instructions may cause the at least one processor to transmit a message to the network to cause the operating mode to be configured for the wireless device's communications with the network. Responsive to the message, the program instructions may cause the at least one processor to receive an indication from the network to configure the wireless device to at least one of: enter the operating mode, exit a prior operating mode, or switch from the prior operating mode to the operating mode.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The systems and methods presented herein include a novel approach for adapting, switching, modifying, configuring, and/or changing an operating mode of a wireless device (e.g., a wearable device and/or a UE) according to (or based on) a communication profile of the wireless device (e.g., a UE application profile indicative of a wireless traffic of an application), a type of motion of the wireless device (e.g., sensed motion data), and/or other information. Certain wireless devices, such as wearable devices (e.g., a head wearable device (HWD)), may suffer from limited coverage (e.g., wireless coverage). For instance, a HWD may have limited antenna efficiency and/or a reduced number of antenna ports, resulting in limited wireless coverage for the HWD.

Certain standards (such as the 3GPP standard) can provide, indicate, and/or specify one or more operating modes (e.g., one or more Tx/Rx modes, such as a coverage enhancement (CE) mode in Long Term Evolution (LTE)) for the wireless device's communications with the network. In some embodiments, the one or more operating modes can extend, improve, enhance, and/or increase coverage by using repetition techniques/approaches. Repetition techniques may enable and/or employ repeat data transmissions (e.g., control channel and/or data channel transmissions) between the wireless device and the network to (e.g., overcome potential signal blockage, noise and/or interference, and) increase wireless coverage, for example. The wireless device can communicate with the network through at least one computing device and/or at least one access point. An example operating mode, CE mode A, can support up to 32 (or other numbers) subframe repetitions of a data channel to further increase coverage (e.g., beyond normal LTE coverage). In another example, CE mode B may support up to 2048 (or other numbers) subframe repetitions of a data channel. However, a wireless device operating in a mode that enables repeat data transmissions, such as CE mode A or CE mode B, may increase power and/or resource consumption, as well as increase latency (e.g., latency of transmissions and/or latency for traffic between the wireless device and the network). In addition, certain operating modes can be semi-static, which may undesirably cause the wireless device to remain in the same operating mode for an extended period of time (e.g., when the wireless device is not required to remain in the operating mode). By remaining in a same operating mode for an extended period of time (e.g., a mode that enables repeat data transmissions), the wireless device may consume additional power and/or network resources. Certain wireless devices, such as devices that support New Radio (NR), NR-LITE, and Next Generation (NG) technology, may suffer from similar problems/issues.

The systems and methods described herein can decrease the power/resource consumption and/or latency of the wireless device by at least 35% (e.g., 45, 55 or other percent) for instance, by switching or changing the operating mode for a wireless device's communications with a network. For instance, the systems and methods presented herein may include a novel approach for reducing the power consumption and/or latency of the device by switching/modifying the operating mode according to a communication profile (e.g., an application profile) and/or a type of motion of the wireless device. In one example, the wireless device may dynamically switch a Tx/Rx mode of the wireless device (e.g., from Category 4 (or Category 1) to CE mode) by using context information (e.g., type of motion and/or other information) of the wireless device, thereby increasing the coverage (e.g., wireless coverage) of the wireless device without consuming/using excessive power and/or network resources.

In some embodiments, the wireless device can transmit a message to the network to cause the operating mode to be configured for the wireless device's communications with the network. For instance, the wireless device may invoke/communicate/cause a CE mode (or other modes) configuration or de-configuration request (e.g., responsive to determining to switch/change an operating mode according to a communication profile and/or a type of motion of the wireless device) by using one or more approaches. In one approach, the wireless device (e.g., a HWD) may communicate, send, and/or transmit a CE mode configuration request (e.g., a message to cause the operating mode to be configured) to the network by providing/specifying one or more reports of at least one measurement metric (e.g., by using a measurement-based threshold to switch/change an operating mode). For example, a report of at least one measurement metric can be generated (e.g., by the wireless device) to trigger and/or cause the network to initiate a radio resource control (RRC) reconfiguration. The RRC reconfiguration may cause the network (e.g., a ground terminal, a base station, a gNB, an eNB, or a serving node) and/or the wireless device to switch/change/update the operating mode (e.g., configure into a CE mode).

Certain operating modes, such as the CE mode may be configured to support one or more scenarios with poor RF (e.g., lower reference signal received power (RSRP)). However, the wireless device can send/generate the one or more reports (e.g., the device can fake/modify the measurement report(s)) under acceptable/adequate channel conditions (e.g., adequate RSRP) to trigger a change in operating mode (e.g., Tx/Rx mode). In another approach, a predetermined/predefined (e.g., predetermined by the wireless device and the network) MAC-based approach/message can trigger/cause/configure the mode switch of the wireless device, wherein certain available reserved bits can be used/configured/repurposed for this approach. In yet another approach, RRC layer signaling (or other types of signaling) to the network can be used/configured (e.g., by the wireless device) to communicate, send, and/or transmit the configuration (and/or de-configuration) requests for a change in operating mode.

In certain embodiments, data/information acquired (e.g., measured, captured or detected) by using motion sensors (e.g., a type of motion of the wireless device and/or other context information) can be used to determine whether to switch, adjust, and/or change the operating mode of the wireless device. The motion sensor(s) can include for example an accelerometer, a gyroscope, a compass, an inertial measurement unit (IMU), an image sensor (to acquire and determine movement via images of the wireless device's surroundings), or a positioning device (e.g., using ultra-wide bandwidth (UWB), global positioning system (GPS), and/or wifi-related mechanisms). For instance, based on motion sensor data, the wireless device can determine a type of motion of the wireless device (e.g., wireless device is stationary and/or in movement). Doppler measurements and/or other types of measurements/mechanisms (e.g., motion sensors and/or positioning mechanisms) may be used to determine and/or characterize a type of motion/movement, such as a pedestrian motion, a biking motion, and/or a vehicular motion. In one example, the wireless device may determine to be configured into an operating mode (e.g., a CE mode and/or other Tx/Rx modes that enable repetition, for instance) if the wireless device is in movement (e.g., less stable/reliable channel conditions or signal strength). In certain scenarios, the coverage of the wireless device may be of paramount concern, and therefore, motion sensor data (e.g., accelerometer data and/or other types of data) can be used to trigger the change in the operating mode (e.g., into a CE mode to extend coverage). In yet another example, the wireless device may determine to be configured out of an operating mode (e.g., CE mode) if the device is stationary. In stationary scenarios, the wireless device may determine to remain in a certain category (e.g., Category 1 or Category 4) until a data transfer and/or transmission is completed, for instance. Once the data transfer is performed, the wireless device may determine to enter and/or enable an idle/sleep/low-power/inactive mode, such as using an extended discontinuous reception (eDRX) mechanism, to save and/or reduce power. In this manner, the wireless device may enhance and/or improve the coverage while reducing/optimizing power (or other network resources) consumption.

Figure 1:
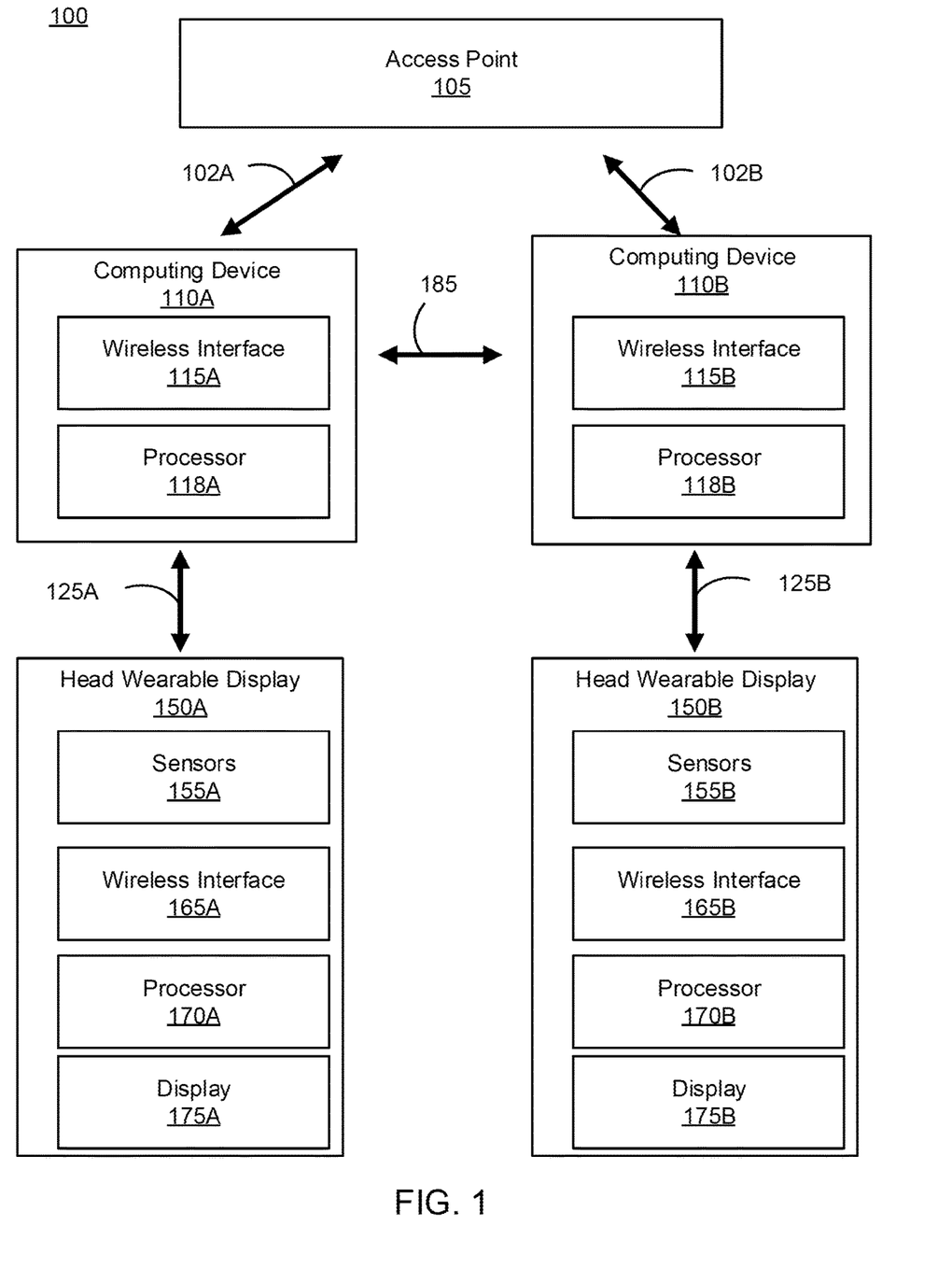
FIG. 1 is a diagram of a system environment including an artificial reality system, according to an example implementation of the present disclosure.

In view of the above discussion regarding changing and/or adapting the operating mode for the wireless device's communications with the network, a process and/or system for performing said changing/adaptation may be beneficial, as further explained in the following passages. FIG. 1 is a block diagram of an example artificial reality system environment 100, in which an operating mode for the wireless device can be adapted and/or negotiated e.g., according to a type of motion of the wireless device and/or a communication profile of an application of the wireless device. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as computing devices or consoles) providing data for artificial reality to the one or more HWDs 150. In some embodiments, a wireless device (for which an operating mode can be changed/adapted according to the systems/ methods presented herein) may include or correspond to the HWD(s) 150 and/or the computing device(s) 110 of the artificial reality system environment 100. In some embodiments, the wireless device (e.g., HWD 150) can communicate with the network via the computing device(s) 110 and/or at least one AP 105.

The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction. In some embodiments, the sensors 155 (e.g., a motion sensor and/or a positioning mechanism) may obtain and/or acquire one or more measurements (and/or other information) to determine a type of motion of a wireless device, such as a HWD 150. For instance, a motion sensor 155 (e.g., an accelerometer) can obtain/provide data indicating that the wireless device is stationary and/or moving (e.g., along a trajectory, at a certain speed, and/or according to a spatial pattern).

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. In some embodiments, the HWD 150 (and/or other wireless devices) can transmit, send, and/or communicate a message to the network via the transceiver (e.g., wireless interface 165). The message may include or correspond to a message to cause an operating mode of the HWD 150 to be configured for the HWD's communications with the network (e.g., to enhance wireless coverage). In some embodiments, the HWD 150 (and/or other wireless devices) can send and/or transmit a report of at least one measurement metric, a message with a predefined value in a MAC header, and/or a message in a RRC layer via the transceiver. In certain embodiments, the HWD 150 (and/or other wireless devices) may receive and/or obtain an indication from the network to configure the HWD 150 via the transceiver.

The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Figure 2:
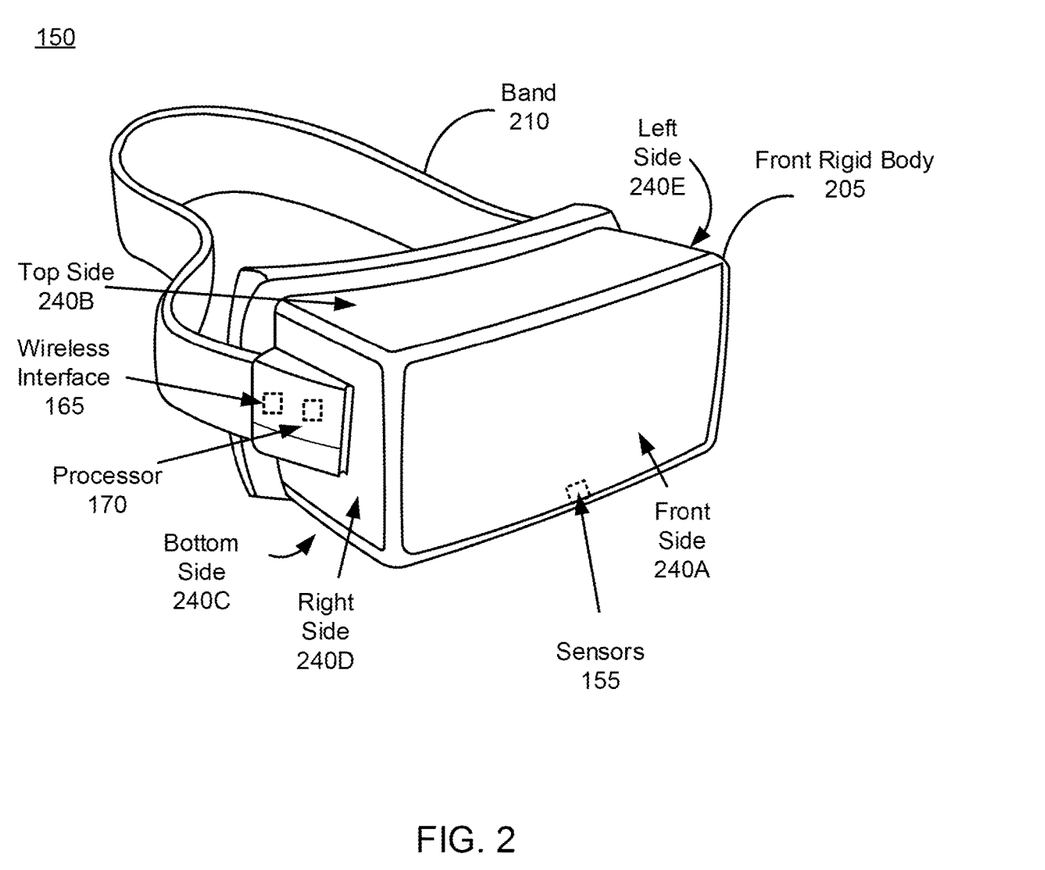
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the display 175 (not shown in FIG. 2), the lens (not shown in FIG. 2), the sensors 155, the wireless interface 165, and the processor 170. In the embodiment shown by FIG. 2, the wireless interface 165, the processor 170, and the sensors 155 are located within the front rigid body 205, and may not visible to the user. In other embodiments, the HWD 150 has a different configuration than shown in FIG. 2. For example, the wireless interface 165, the processor 170, and/or the sensors 155 may be in different locations than shown in FIG. 2.

Figure 3:
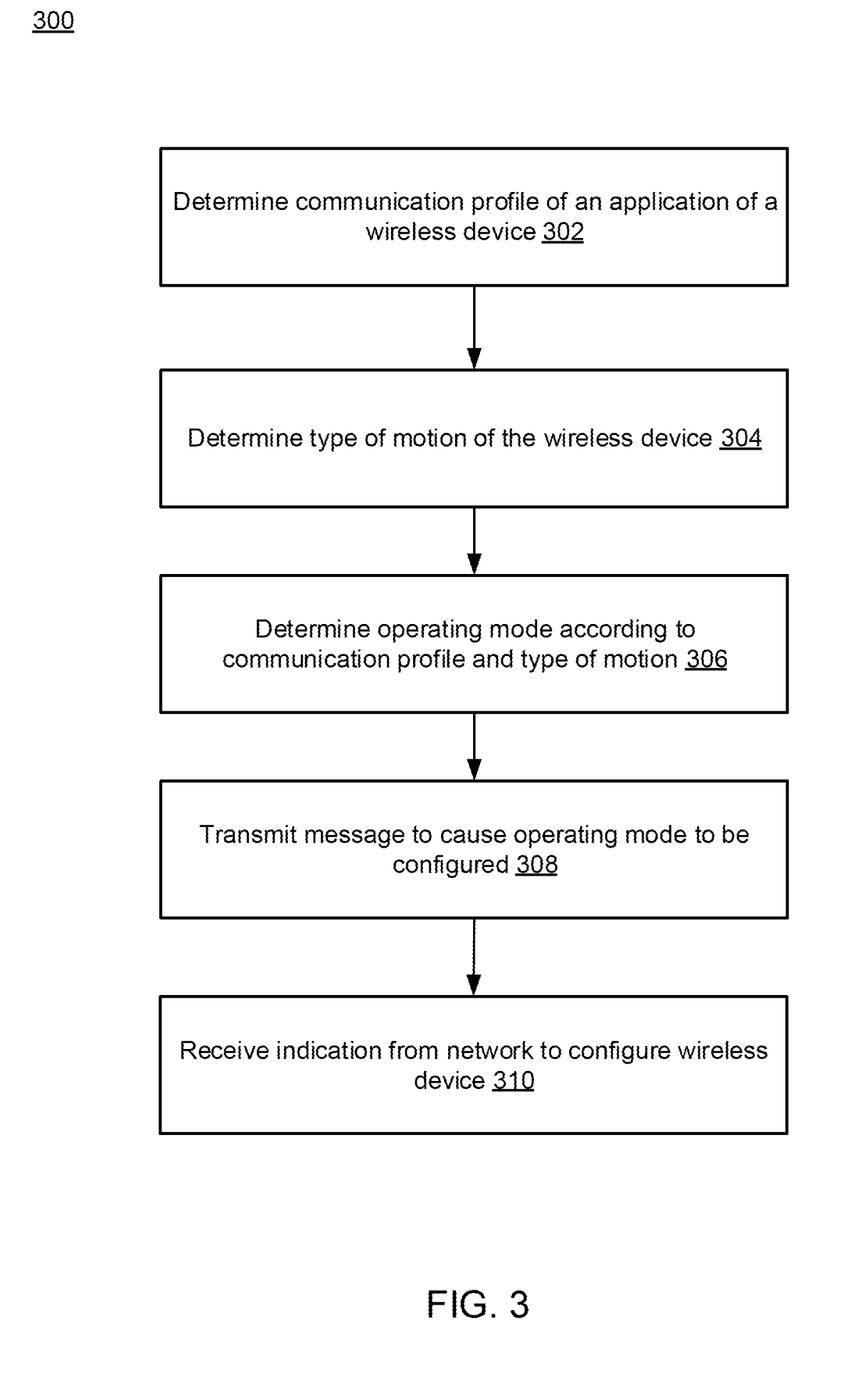
FIG. 3 is a flowchart of an example method for adjusting an operating mode for a wireless device's communications with a network, according to an example implementation of the present disclosure.
Figure 4:
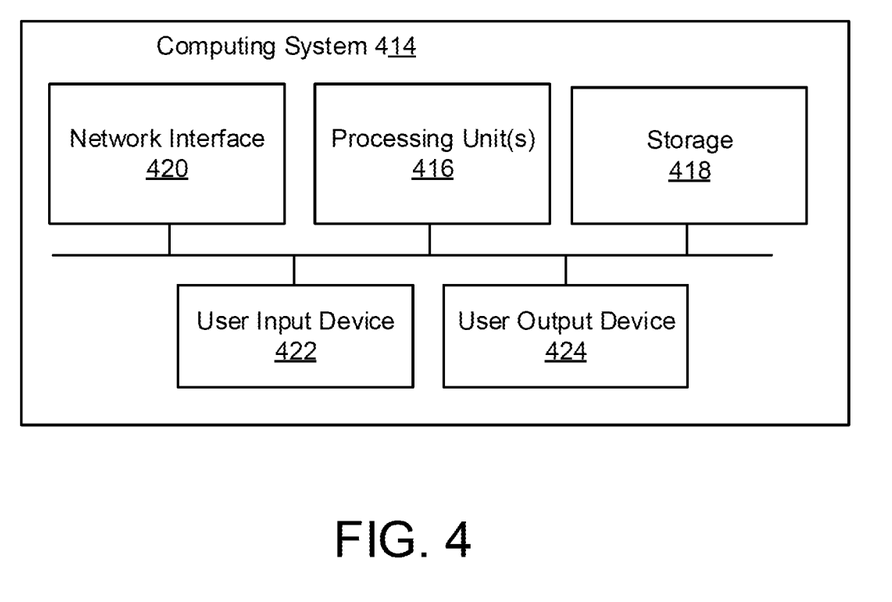
FIG. 4 is a block diagram of a computing environment, according to an example implementation of the present disclosure.

FIG. 3 is a flow diagram of one embodiment of a process 300 for adjusting an operating mode for a wireless device's (e.g., HWD 110) communications with a network, according to an example implementation of the present disclosure. The functionalities of the process 300 may be implemented using, or performed by, the components detailed herein in connection with FIGS. 1-2. In some embodiments, the process 300 can be performed by the computing device 110, such as a first device 110A and/or a second device 110B. In some embodiments, the process 300 can be performed by other entities, such as an access point 105 and/or a HWD 150 (or other devices). In some embodiments, the process 300 may include more, fewer, or different steps than shown in FIG. 3.

In brief overview, a wireless device may determine a communication profile of an application of the wireless device (302). The wireless device may determine a type of motion of the wireless device (304). The wireless device may determine an operating mode according to the communication profile and/or the type of motion (306). The wireless device may transmit a message to cause the operating mode to be configured (308). The wireless device may receive an indication from the network to configure the wireless device (310).

Referring now to operation (302), and in some embodiments, a wireless device (e.g., HWD 110 and/or a UE) may determine and/or identify a communication profile of an application of the wireless device. The communication profile can be indicative of a type or characteristic of the application's wireless traffic (e.g., traffic associated to an application and/or web page, such as such as video data, AR data, and/or VR data) between the wireless device and the network. In some embodiments, the communication profile may be indicative of a required and/or desired latency, data rate and/or reliability for the wireless traffic (e.g., for a particular type of application, type of traffic and/quality of service (QoS)). For instance, certain applications (e.g., AR and/or VR applications) may require/specify/target a reduced/minimum latency for the wireless traffic (e.g., to ensure proper execution of the applications). In another example, an application of the wireless device may require/specify/target the wireless traffic to be increasingly reliable (e.g., to reduce the number/amount/quantity of dropped messages/transmissions between the wireless device and the network). As such, the communication profile can indicate and/or provide one or more specifications (e.g., required/targeted latency/reliability and/or a type/characteristic of the application's wireless traffic) to ensure an adequate and/or desired execution/operation/performance of the application (e.g., an application resource and/or a web application). Via the communication profile, the wireless device may determine and/or identify said specification(s)/requirement(s) of the application. Responsive to determining the performance specification(s) of the application via the communication profile, the wireless device may determine an operating mode for the wireless device's communications with the network (e.g., based on the information indicated via the communication profile).

Referring now to operation (304), and in some embodiments, the wireless device may determine a type of motion of the wireless device. In some embodiments, the wireless device may determine and/or identify that the wireless device is stationary (e.g., lack of motion, and therefore the speed of the wireless device is zero). In stationary scenarios, the wireless device may determine to remain in a certain category (e.g., Category 1 or Category 4) until a data transfer and/or transmission is completed, for instance. In another example, the wireless device may determine that the wireless device is moving, for example, along a trajectory (e.g. along a path) and/or at a speed within a range, above a threshold, or below the threshold. For instance, a reduction in the speed of the wireless device (e.g., below the threshold) may be indicative that the wireless device has changed from a vehicular motion to a pedestrian motion. In certain embodiments, the wireless device may determine that the wireless device is moving according to (or based on) a speed and/or spatial pattern. In one example, if the wireless device is determined to be moving along a predictable trajectory (e.g., along a train rail) and/or according to a particular speed (e.g., a constant speed), the wireless device may determine to remain in a same operating mode. For instance, the wireless coverage along the trajectory is known to be consistent, and therefore, the wireless device can determine to remain in the same operating mode (e.g., due to relatively stable, unchanging conditions). If the wireless coverage along the trajectory is known to be inconsistent (e.g., worsening conditions along the trajectory), the wireless device may determine to be configured into a different operating mode (e.g., to increase wireless coverage) by transmitting a message to the network.

In some embodiments, the wireless device may determine the type of motion using at least one of: a motion sensor (e.g., accelerometer, gyroscope, and/or an inertial measurement unit (IMU)), a positioning mechanism (e.g., magnetometer and/or an IMU), and/or a Doppler measurement. For instance, one or more Doppler measurements and/or other types of measurements/mechanisms (e.g., motion sensors and/or positioning mechanisms) may be used to determine a type of motion/movement of the wireless device, such as a pedestrian motion, a biking motion, and/or a vehicular motion. The wireless device may use data/information corresponding to (or obtained from) the motion sensor, positioning mechanism, and/or Doppler measurements to determine the operating mode (e.g., whether to change the operating mode) of the wireless device. In one example, the wireless device may determine that the wireless device is moving at a speed that is above a predetermined threshold (e.g., above a certain number of km/h). An accelerometer (or other sensors/mechanisms/measurements) of the wireless device may indicate and/or specify the change (e.g., the increase) in speed of the wireless device. Responsive to the change in speed (e.g., increase above the threshold), the wireless device may determine to be configured into another operating mode (e.g., due to less stable/reliable channel conditions or signal strength). For example, the wireless device may determine to send a message to the network to cause the operating mode to be configured into an operating mode with an increased number of repeat transmissions (e.g., CE Mode A/B).

Referring now to operation (306), and in some embodiments, the wireless device may determine and/or configure an operating mode (e.g. CE modes and/or other modes) for the wireless device's communications (e.g., UL and/or DL communications) with the network. The wireless device may determine the operating mode according to the determined communication profile and/or the type of motion of the wireless device. In one example, the wireless device may determine the communication profile indicates that a target/specified/required latency for the wireless traffic is substantially less than the current latency for the wireless traffic. In addition, the wireless device may determine that the device is moving at a speed that is above a threshold (e.g., from a pedestrian speed to a vehicular speed). As such, the wireless device may determine an operating mode (e.g., for the wireless device's communications with the network) that provides sufficient coverage, given the communication profile and/or the type of motion of the device (e.g., an operating mode that enables repeat data transmissions, such as a CE mode). In another example, the wireless device may determine and/or identify that the communication profile is indicative of a latency for the wireless traffic that is substantially greater than the current latency for the wireless traffic. In addition, the wireless device may determine that the device is moving at a speed (and/or acceleration) that remains within a range (e.g., within a range of speeds for pedestrian movement). As such, the wireless device may determine an operating mode that provides sufficient coverage without increasing the power consumption of the device, given the communication profile and/or the type of motion of the device (e.g., an operating mode that disables repeat data transmissions, such as an idle mode to save and/or reduce power). In some embodiments, the operating mode may include, indicate, specify, and/or provide an indication of a number/amount of repetition for data transmission (e.g., repetition number in CE Mode A/B). For example, a CE Mode A may indicate 32 (or other numbers) subframe repetitions of a data channel to further increase coverage. Furthermore, the operating mode may include a number of hybrid automatic request (HARQ) processes, and/or a scaling of the transport block size. For instance, the operating mode may indicate and/or specify a number of HARQ acknowledgement messages (e.g., HARQ ACK/NACK) to be transmitted corresponding to (or associated with) wireless traffic between the wireless device and the network).

In some embodiments, the wireless device may determine, identify, and/or select the operating mode by selecting the operating mode from a plurality of predefined operating modes (e.g., CE mode A, CE mode B, Category 1, Category 4, and/or other operating modes). In some embodiments, the wireless device may determine the operating mode further according to (or based on) whether the application is operating in foreground or background. For instance, if an application targets/specifies/requires an increased reliability (e.g., according to the communication profile) but is operating in the background (e.g., indicating that a user may not be actively using or relying on the application at this time), the wireless device may determine to remain in a same operating mode, without switching to another operating mode that supports the required reliability (e.g., to save reduce resource/power consumption). If the same application is now operating in the foreground (e.g., indicating that a user may be actively using or relying on the application at this time), the wireless device may determine to switch/change/modify the operating mode into a mode that enables repeat transmissions, for instance. By determining another operating mode (e.g., a mode that supports the required reliability) responsive to a change in operation (e.g., from the background to the foreground), the wireless device can save/reduce power by dynamically determining the operating mode according to the communication profile, the type of motion of the wireless device, and/or the change in operation.

Referring now to operation (308), and in some embodiments, the wireless device may transmit, send, and/or communicate a message to the network. Transmitting the message may cause and/or trigger the operating mode to be configured for the wireless device's communications with the network. As such, the wireless device may indicate/communicate to the network, via the transmitted message, that the wireless device has determined to enter, exit, and/or switch to a particular operating mode (e.g., according to a communication profile and/or a type of motion of the wireless device) to support the wireless device's communications with the network (e.g., to support a wireless coverage, required latency, and/or desired reliability). In some embodiments, the message may include or correspond to a report of at least one measurement metric, a message with a predefined value in a MAC header, and/or a message in a RRC layer (and/or other layers). For instance, the wireless device may communicate, send, and/or transmit a CE mode configuration request (e.g., a message to cause the operating mode to be configured) to the network by providing/specifying one or more reports of at least one measurement metric (e.g., configured/modified to trigger a CE mode configuration/change). In another example, RRC layer signaling (or other types of higher layer signaling) can be used (e.g., by the wireless device) to communicate, send, and/or transmit the configuration (and/or de-configuration) requests for a change in operating mode. In yet another example, a MAC-based approach/message (e.g., a message with a predefined value in a MAC header) can trigger, cause, and/or communicate a change in the operating mode of the wireless device. Once the network receives the transmitted message, the network may send, transmit, and/or communicate an indication to the wireless device (310). The indication may include or correspond to an indication to configure the wireless device to enter the operating mode, exit a prior operating mode, and/or switch from the prior operating mode to the operating mode. Responsive to receiving/obtaining the indication, the wireless device may enter, exit, and/or switch an operating mode (e.g., the operating mode determined by the wireless device).

Various operations described herein can be implemented on computer systems. FIG. 5 shows a block diagram of a representative computing system 414 usable to implement the present disclosure. In some embodiments, the computing device 110, the HWD 150 or both of FIG. 1 are implemented by the computing system 414. Computing system 414 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation.

Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by a wireless device, a communication profile of an application on the wireless device communicating with a network;
   determining, by the wireless device, a type of motion of the wireless device;
   determining, by the wireless device, an operating mode for the wireless device's communications with the network, according to the communication profile and the type of motion; and
   transmitting, by the wireless device, a message to the network to cause the operating mode to be configured for the wireless device's communications with the network.

2. The method of claim 1, wherein the communication profile is indicative of at least one of:
   a type or characteristic of the application's wireless traffic between the wireless device and the network,
   a required or desired latency for the application's wireless traffic, or
   a required or desired reliability for the application's wireless traffic.

3. The method of claim 1, comprising:
   determining, by the wireless device, the type of motion using at least one of: a motion sensor, or a positioning mechanism, or a Doppler measurement.

4. The method of claim 1, comprising:
   determining, by the wireless device, the operating mode for the wireless device's communications with the network, by selecting the operating mode from a plurality of predefined operating modes.

5. The method of claim 1, wherein the operating mode includes an indication of at least one of: a number of repetition for data transmission, a number of hybrid automatic request (HARM) processes, or a scaling of the transport block size.

6. The method of claim 1, comprising:
   determining, by the wireless device, the operating mode for the wireless device's communications with the network, further according to whether the application is operating in foreground or background.

7. The method of claim 1, wherein the message comprises:
   a report of at least one measurement metric,
   a message with a predefined value in a medium access control (MAC) header, or
   a message in a radio resource control (RRC) layer.

8. The method of claim 1, wherein determining the type of motion of the wireless device comprises determining that the wireless device is:
   stationary;
   moving along a trajectory;
   moving at a speed within a range, above a threshold, or below the threshold; or
   moving according to a speed or spatial pattern.

9. The method of claim 1, comprising:
   receiving, by the wireless device responsive to the message, an indication from the network to configure the wireless device to at least one of: enter the operating mode, exit a prior operating mode, or switch from the prior operating mode to the operating mode.

10. A wireless device comprising:
    at least one processor configured to:
    determine a communication profile of an application of on the wireless device communicating with a network;
    determine a type of motion of the wireless device;
    determine an operating mode for the wireless device's communications with the network, according to the communication profile and the type of motion; and
    transmit a message to the network to cause the operating mode to be configured for the wireless device's communications with the network.

11. The wireless device of claim 10, wherein the communication profile is indicative of at least one of:
    a type or characteristic of the application's wireless traffic between the wireless device and the network,
    a required or desired latency for the application's wireless traffic, or
    a required or desired reliability for the application's wireless traffic.

12. The wireless device of claim 10, wherein the at least one processor is configured to:
    determine the type of motion using at least one of: a motion sensor, or a positioning mechanism, or a Doppler measurement.

13. The wireless device of claim 10, wherein the at least one processor is configured to:
    determine the operating mode for the wireless device's communications with the network, by selecting the operating mode from a plurality of predefined operating modes.

14. The wireless device of claim 10, wherein the operating mode includes an indication of at least one of: a number of repetition for data transmission, a number of hybrid automatic request (HARD) processes, or a scaling of the transport block size.

15. The wireless device of claim 10, wherein the at least one processor is configured to:
    determine the operating mode for the wireless device's communications with the network, further according to whether the application is operating in foreground or background.

16. The wireless device of claim 10, wherein the message comprises:
    a report of at least one measurement metric,
    a message with a predefined value in a medium access control (MAC) header, or
    a message in a radio resource control (RRC) layer.

17. The wireless device of claim 10, wherein the at least one processor is configured to determine the type of motion of the wireless device, comprising determining that the wireless device is:
    stationary;
    moving along a trajectory;
    moving at a speed within a range, above a threshold, or below a threshold; or
    moving according to a speed or spatial pattern.

18. The wireless device of claim 10, wherein the at least one processor is configured to:
    receive, responsive to the message, an indication from the network to configure the wireless device to at least one of: enter the operating mode, exit a prior operating mode, or switch from the prior operating mode to the operating mode.

19. A non-transitory computer readable medium storing program instructions for causing at least one processor of a device to:
    determine a communication profile of an application on the wireless device communicating with a network;

determine a type of motion of the wireless device;
determine an operating mode for the wireless device's communications with the network, according to the communication profile and the type of motion; and
transmit a message to the network to cause the operating mode to be configured for the wireless device's communications with the network.

20. The non-transitory computer readable medium of claim 19, wherein the program instructions cause the at least one processor to:
receive, responsive to the message, an indication from the network to configure the wireless device to at least one of: enter the operating mode, exit a prior operating mode, or switch from the prior operating mode to the operating mode.

\* \* \* \* \*